US007758666B2

(12) United States Patent
Meerpohl

(10) Patent No.: US 7,758,666 B2
(45) Date of Patent: Jul. 20, 2010

(54) FILTER ELEMENT

(75) Inventor: Bernd Meerpohl, Vechta/Langförden (DE)

(73) Assignee: Big Dutchman International GmbH (DE)

( * ) Notice: Subject to any disclaimer, the term of this patent is extended or adjusted under 35 U.S.C. 154(b) by 154 days.

(21) Appl. No.: 11/273,843

(22) Filed: Nov. 7, 2005

(65) Prior Publication Data

US 2006/0096259 A1 May 11, 2006

(30) Foreign Application Priority Data

Nov. 9, 2004 (DE) .................. 20 2004 017 413 U

(51) Int. Cl.
*B01D 39/00* (2006.01)
*B01D 53/00* (2006.01)
*B01D 41/00* (2006.01)
*B31B 1/25* (2006.01)

(52) U.S. Cl. ............................. 55/497; 55/489; 55/294; 493/60

(58) Field of Classification Search ............ 55/489, 55/96, 497, 294; 493/60; 210/493
See application file for complete search history.

(56) References Cited

U.S. PATENT DOCUMENTS

| | | | | | |
|---|---|---|---|---|---|
| 2,228,320 | A | * | 1/1941 | Magruder, Jr. et al. | 210/508 |
| 3,013,667 | A | * | 12/1961 | Jackson et al. | 210/493.1 |
| 3,731,815 | A | * | 5/1973 | Collingwood et al. | 210/496 |
| 3,757,497 | A | * | 9/1973 | Ray | 55/302 |
| 4,482,367 | A | * | 11/1984 | Howeth | 55/304 |
| 5,051,118 | A | | 9/1991 | Andreae | |
| 5,505,852 | A | * | 4/1996 | van Rossen | 210/493.3 |
| 6,033,453 | A | * | 3/2000 | Weddell, III | 55/493 |
| 6,093,250 | A | * | 7/2000 | Salazar et al. | 118/668 |
| 6,290,635 | B1 | * | 9/2001 | Demmel et al. | 493/399 |
| 6,328,778 | B1 | | 12/2001 | Richerson et al. | |
| 6,585,793 | B2 | * | 7/2003 | Richerson et al. | 55/521 |
| 2002/0132960 | A1 | * | 9/2002 | Haile et al. | 528/272 |
| 2007/0017193 | A1 | * | 1/2007 | Nishio et al. | 55/492 |

FOREIGN PATENT DOCUMENTS

DE 1293004 4/1969
DE 3879533 T2 8/1993

(Continued)

*Primary Examiner*—Walter D Griffin
*Assistant Examiner*—Amber Orlando
(74) *Attorney, Agent, or Firm*—Price, Heneveld, Cooper, DeWitt & Litton, LLP

(57) ABSTRACT

A filter element and related method for separating particles from a particle laden unfiltered gas flow and a method for manufacturing such a filter element, wherein the filter element includes a first filter wall having a plurality of first through-flow openings for entry of contaminated unfiltered gas; a second filter wall disposed downstream of the first filter wall in the flow direction, and having a plurality of second through-flow openings for exit of clean gas; and an intermediate flow space disposed between the first and second filter walls, wherein the second through-flow openings are arranged in a displaced relationship with the first through-flow openings in the flow direction; the second filter wall has at least one impingement wall region arranged so that particles passing through the first through-flow openings at least partially impinge thereon; and at least one of the first and second filter walls has folds which extend alternately inward and outward relative to the intermediate flow space and has increased deformability in relation to the rest of the wall.

29 Claims, 4 Drawing Sheets

FOREIGN PATENT DOCUMENTS

| | | |
|---|---|---|
| DE | 9404440 | 7/1994 |
| EP | 0285322 B1 | 3/1993 |
| GB | 917669 | 2/1963 |
| JP | 2-293013 | 12/1990 |
| WO | WO 94/13387 | 6/1994 |
| WO | WO 94/28997 | 12/1994 |

* cited by examiner

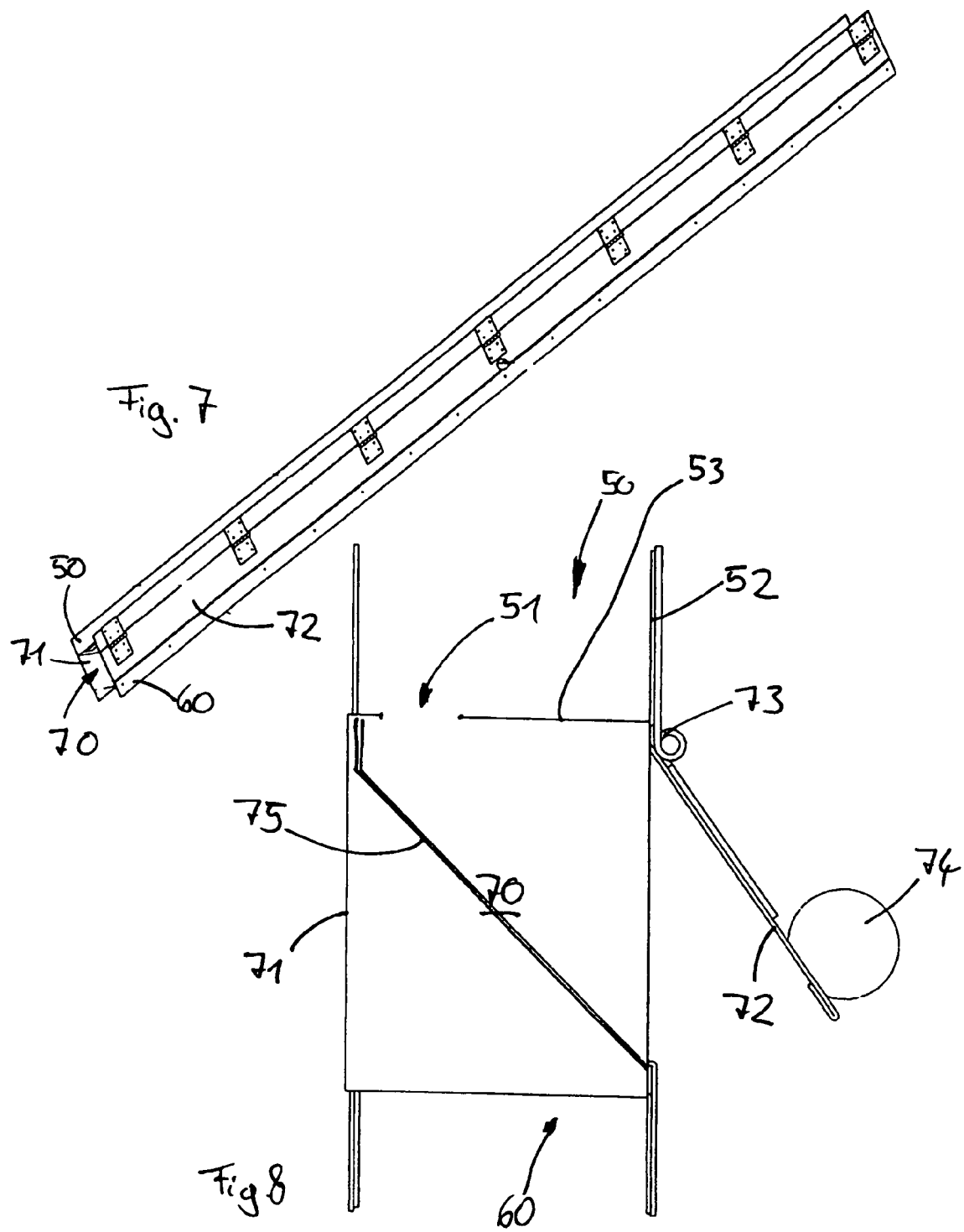

FILTER ELEMENT

CLAIM OF PRIORITY

Applicant hereby claims the priority benefits under the provisions of 35 U.S.C. §119, basing said claim of priority on German Patent Application Serial No. 20 2004 017 413.8, filed Nov. 9, 2004. In accordance with the provisions of 35 U.S.C. §119 and Rule 55(b), a certified copy of the above-noted German patent application will be filed before grant of a patent.

BACKGROUND OF THE INVENTION

The invention concerns a filter element for separating particles from a particle-laden raw unfiltered gas flow, including a first filter wall having a plurality of first through-flow openings for the entry of the contaminated unfiltered gas, a second filter wall which is arranged downstream of the first filter wall in the flow direction and has a plurality of second through-flow openings for the exit of the clean gas, an intermediate flow space between the first and the second filter walls, wherein the second through-flow openings are arranged in displaced relationship with the first through-flow openings in the flow direction, the second filter wall has at least one impingement wall region so arranged that the particles passing through the first through-flow openings at least partially impinge thereon, and the first and/or the second filter wall is in the form of a wall which is pleated or folded alternately inwardly and outwardly relative to the intermediate flow space, in particular in the form of a folded foil or plate.

Filter elements of the above-indicated kind are known for filtering the outgoing discharge air in painting installations. Those filter elements are based on the operating principle of centrifugal force separation. With that principle, the particle-laden discharge air, that is to say the unfiltered gas flow, passes through the first through-flow openings into the filter element and is deflected by virtue of the displaced arrangement of the second through-flow openings in the intermediate flow space. In that deflection process, the particles in the unfiltered gas flow, which are of a higher density than the unfiltered gas entraining them, cannot follow the flow path and impinge against the impingement wall. The particles adhere to the impingement wall and therefore accumulate in that impingement wall region, whereas the gas flow from which the particles have been removed issues from the filter element through the second through-flow openings, as clean gas.

In the filters of the above-indicated kind, a layer of particles gradually builds up in that way during the period of operation, and after a given period of operation, that layer of particles results in clogging of the filter or an increase in the flow resistance of the filter. In that case, it is necessary to exchange the previously known filters and to replace the contaminated filter element with a fresh filter element.

As the previously known filter elements are used as non-reusable or disposable elements, they are preferably manufactured from inexpensive materials, in particular paper and cardboard. It is known from DE 1 293 004 A to produce such filters from metal, paper, cardboard or plastic films.

A first problem of the known filter elements is that the regularly required exchange or replacement of the filter elements results in an increased waste volume. In addition the regularly required exchange of the filter element causes increased operating costs as it is regularly necessary to replace the old, clogged filter elements with fresh filter elements.

A further problem of the known filter elements is that, particularly when higher value filter materials such as plastics, metals or the like are used, the filters are often bulky, as those higher value materials are also of greater strengths, and as a result, the filter walls can scarcely be deformed or are difficult to deform and the filter element can scarcely be compressed in regard to its volume.

That disadvantage arises in particular in those uses in which a large wall area is to be covered with the known filter elements in order to achieve filtering of even very fine particles with high volume flow, or other similar applications. In such applications, it is necessary for the through-flow openings to be small and for deflection of the gas flow in the intermediate flow region to be implemented as far as possible through an acute angle in order also to provide for effective separation of very fine particles out of the unfiltered gas flow. In regard to such situations of use however, it is desirable both to be able to transport and store the fresh filter elements in a compact packaging volume, and also to be able to dispose of the used filter elements in a compact, space efficient format. Therefore, it is precisely for such large area uses that only filter elements of paper and cardboard are known, as making the filter element from those materials makes it possible to achieve such a reduction in the transportation and storage volume, because of the good elastic deformability of the materials.

A further problem of known filter elements is that they cannot be employed for a wide variety of different applications. Thus, for example in the sector of agricultural operations, in particular in animal husbandry, increasingly tighter emission requirements mean that it is necessary to clean the outgoing discharge air from operating spaces, such as for example stables and sheds. That discharge air is usually considerably dust-laden, and in addition, often carries animal excretions therewith. In the case of known filter elements, that results in rapid clogging and/or a chemical attack on the filter element, which adversely effects operation thereof. In both cases, replacement of the filter elements is required at very short time intervals, so that those known filter elements cannot be used economically in such cases.

SUMMARY OF THE INVENTION

The object of the invention is to provide a filter element which reduces or avoids the above-indicated problems.

In accordance with the invention, that object is attained by a filter element of the type discussed above, and wherein the wall of the first and/or second filter wall in the region of the folds has increased deformability in relation to the rest of the wall region. By virtue of the increased deformability in the region of the folds, it is easily possible for the filter element to be compressed or reduced in a volume which is compact in relation to the operating condition, insofar as it is bent over along the folds in accordion fashion, so that the walls of the filter wall lie completely or almost against each other in a compacted format. In that way, the configuration according to the invention permits the use of a large number of materials. The filter element according to the invention therefore also makes it possible to use filter elements comprising materials other than paper or cardboard, for large-area filter arrangements. Accordingly, the invention provides filter elements comprising chemically resistant materials.

The enhanced deformability in the region of the folds can be achieved or afforded both by increased elastic deformability and also by increased plastic deformability or a combination thereof. In that respect, the term deformability is used to mean primarily that the material can be deformed in the corresponding region under the effect of a lower force, than the remaining wall region. In addition, the term deformability is used in accordance with the invention to mean that the filter material can be folded at a more acute angle in the corresponding region, and preferably can be deformed to a higher degree than the rest of the wall region, without material damage occurring.

It is usually advantageous if the first filter wall is fixed to the second filter wall. That fixing can be effected in particular in the region of the folds, for example by welding, adhesive or other known techniques.

It has surprisingly been found that the development according to the invention of the known filter element is also advantageous for the manufacturing procedure as formation of the folds of the filter element is facilitated by virtue of the increased deformability.

In a first advantageous embodiment, the entire first and/or second filter wall is liquid-resistant. That embodiment permits the particles accumulated in the filter element to be removed by a cleaning operation with a liquid, for example by high pressure cleaning with water. That development in a particularly simple manner permits restoration and reuse of the original through-put volume when particles have become deposited in the filter element.

The prior art filter element discussed above can be further advantageously improved if the impingement wall region or the filter walls comprise a base material, preferably paper or cardboard, and are coated with a liquid-resistant material. That embodiment makes it possible for cleaning of the filter element to be carried out with a liquid, without the entire filter element having to be made from a liquid-resistant material, for that purpose. Advantageous deformability of a series of base materials which are not liquid-resistant and which are inexpensive can therefore be utilized for compression of the volume of the filter element for transport or storage thereof, without having to accept the disadvantages of those base materials which usually require replacement when the filter element is clogged with particles.

In that respect, it is particularly advantageous if a plastic material is used as the liquid-resistant material for that coating or for the filter walls. Plastic materials have the advantage that they are resistant to a series of liquids, so cleaning is possible, possibly with added cleaning agents, without the plastic material being damaged. It has further proven to be advantageous that plastic materials are resistant to a series of chemicals and thus also permit filtering of chemically aggressive substances from the unfiltered gas flow without the chemical substances, which are filtered out, damaging the filter element. In particular, bulk plastic materials, such as polypropylene (PP), polyethylene (PE), polyvinylchloride (PVC) or polycarbonate (PC), are suitable for the filter element according to the invention.

It is further advantageous if the region around the fold locations of the second filter wall, which fold locations are outward on the filter element, is the impingement wall region. That configuration permits particularly effective filtering as in that case the unfiltered gas flow is deflected through the first through-flow openings on to the fold region of the second filter wall and is thus subjected to a sharp deflection effect in order to be guided out of that corner.

It is further advantageous if both filter walls are folded in such a way that the spacings between the folds, in particular the outward folds, of the first filter wall are equal to the spacings between the folds, in particular the inward folds, of the second filter wall, and the two filter walls are so arranged relative to each other that folds in the same direction are respectively in a mutually opposite relationship. That provides a zigzag-shaped geometry which is doubled in cross section and which, on the one hand, has the advantage that the filter wall is of sufficient stability to be arranged in a self-supporting relationship, for example in the region of a wall, particularly when the folds are oriented vertically. In addition, with that geometry, it is possible to achieve particularly good compression of the filter wall for the purposes of transport or storage.

The first and second through-flow openings can be arranged in the first and second filter walls respectively in different ways. In that respect, the aim or objective is to provide a sufficient change in the direction of the unfiltered gas flow on the path between the entry opening to the exit opening and to prevent the openings from becoming clogged by filtered particles.

In particular, the first through-flow openings can be arranged in the region of the inward folds of the first filter wall.

Furthermore, alternatively to or in addition to the above-mentioned embodiment, the first through-flow openings can be arranged in the region of the outward folds of the first filter wall.

The second through-flow openings can advantageously be arranged in the region of the inward folds of the second filter wall.

In the three cases referred to above, the openings can respectively be arranged laterally of the folds, for example in the form of a plurality of openings arranged in paired relationship, approximately symmetrically on both sides of the folds, or they can be arranged in the form of a respective opening which extends over the fold and is thus partially in one wall region and partially in the other wall region. Thus, for example, the first through-flow openings can be in the form of holes which are disposed in respective halves thereof in the wall region which is to the left and to the right respectively of the fold.

Furthermore, in many situations of use, it is alternatively or additionally advantageous if the second through-flow openings are arranged in the wall region between the folds of the second filter wall. In these embodiments, the arrangement of the second through-flow openings can be downstream of the first through-flow openings in the direction of flow through the filter element, so as to provide for acute angled deflection of the unfiltered gas flow and consequently particularly efficient filtering.

It is particularly advantageous if the first and/or second filter wall in the fold line is of a strength which is reduced in relation to the rest of the wall region. The reduced strength usually provides that, when forces act on the filter wall, deformation is achieved in particular in the fold line. The reduced strength can be achieved for example by modified material properties or a modified geometry in the region of the fold line.

It is particularly advantageous if the first and/or second filter wall in the fold line is of a wall thickness which is reduced at least in portion-wise manner with respect to the rest of the wall region. The reduced wall thickness can be achieved for example in the form of cutting removal of a part of the wall (scratching cutting, notching etc). In that respect, it is possible to provide for a continuous reduction in wall thickness over the entire length of the fold line or a discontinuous reduction in wall thickness in which only portions of the fold line are reduced in wall thickness. In particular, it is advantageous if the reduction in wall thickness is achieved by deformation without the removal of material, in which case for example the wall material is displaced out of the region of the fold line into the region which is beside the fold line.

In addition, in certain uses, it is advantageous if the first and/or second filter wall in the fold line comprises a different material from the rest of the wall region. Thus, for example, a material of a lower modulus of elasticity and/or involving easier plastic deformability can be provided in the region of the fold line. It is further possible for the material of the filter wall to be so modified in its properties by subsequent treatment (for example irradiation, heat treatment, chemical treatment) that a different material with properties which are advantageous for the folding effect is produced.

In particular, it is advantageous if the first and/or second filter wall has perforations in the fold line. That provides for a weakening of the fold line region, which affords better deformability along the fold line in order to achieve the advantages according to the invention. The perforations can be in the form of holes at regular spacings, slots or the like.

A further aspect of the invention is a gas filter having a plurality of filter elements of the above-described kind, which are arranged in a mutually juxtaposed and/or superposed relationship. The filter elements according to the invention can usually be available only in limited dimensions by virtue of production restrictions, in particular restrictions in respect of the availability of the starting semi-manufactured items for production of the filter element. In order to provide a gas filter having large entry and exit surface areas, it is therefore usually necessary for a plurality of filter elements to be arranged in a row with each other. In that case, the filter elements can be arranged on the one hand in a laterally mutually juxtaposed relationship in order to afford a gas filter which extends over a longer wall. In addition, the filter elements can be arranged in a mutually superposed relationship to give a gas filter which extends over a great height. Finally, in certain uses, it is advantageous for the filter elements according to the invention also to be arranged one behind the other, so that the air filtered by the first filter element, after issuing from the first filter element, passes into the second filter element, which is arranged therebehind, and is filtered afresh there. That makes it possible to achieve an improved filter performance. In particular, a combination of the above-mentioned arrangements is advantageous in many situations of use.

A development of the gas filter according to the invention can provide that the filter elements are arranged in a mutually superposed relationship and are connected together by means of a connecting profile, including an upper receiving region for receiving the upper filter element, a lower receiving region for receiving the lower filter element, a particle collecting region arranged between the two receiving regions, and at least one opening which is arranged between the upper receiving region and the particle collecting region and through which the particles can drop out of the upper filter element into the particle collecting region.

The connecting profile according to the invention permits a plurality of filter elements to be arranged in a stable vertical row with each other in a particularly inexpensive fashion. In that respect, the connecting profile according to the invention eliminates the necessity for particles which are collected in the upper filter element having to be discharged, in the operation of cleaning the filter element, through the lower filter element, which could often result in clogging of the lower filter element. That makes it possible to effectively build up gas filters from a plurality of filter elements which are stacked one above the other, without problems occurring in particular in the lower region of the gas filter, due to the collected particles being discharged under the effect of the force of gravity.

In that respect, it is particularly advantageous if there is provided an opening flap which, in the closed condition, closes off the particle collecting region from the surroundings, and in the open condition, permits the removal of the collected particles from the particle collecting region. The opening flap is then usually closed in the operating condition when blowers are switched on in order to prevent the particles from being swirled up in the collecting region. When the blower is switched off, to clean the gas filter according to the invention, the opening flap can be opened and easy access to the collected particles is possible.

A further development of the two above-indicated embodiments can provide that between the particle collecting region and the upper or the lower receiving region respectively there is a horizontal wall portion which prevents the entry of unfiltered gas from the particle collecting region of the connecting profile into the intermediate flow region of the filter element. That is particularly advantageous if the first filter wall is folded in order to prevent an access in respect of unfiltered gas flow into the intermediate flow region through the lateral openings provided in the projecting folds at the lower and upper ends of the filter element, which access would not take place in the flow direction required for filtering and consequently permit particles to pass through the filter element.

It is further advantageous if, in a gas filter according to the invention, the lowermost filter element is also supported by a connecting profile of the above-indicated kind on the ground. In this case the lower receiving region of the connecting profile can admittedly be adapted to receive a lower filter element, but it serves for supporting the filter element on the ground. That represents an inexpensive and low maintenance configuration of the filter according to the invention.

The filter element according to the invention preferably operates in accordance with a filter method for the separation of particles from a particle-laden unfiltered gas flow comprising the steps of:

a) introducing an unfiltered gas flow through a plurality of first through-flow openings in a first filter wall of a filter element, b) discharging the clean gas flow through a plurality of second through-flow openings in a second filter wall of the filter element, which is arranged downstream of the first filter wall in the flow direction, c) deflecting the unfiltered gas flow into an intermediate flow space between the first and the second filter walls for centrifugal force deposit at least of a part of the particles contained in the unfiltered gas flow on to an impingement wall region of the second filter wall, d) wherein the deposited particles accumulate in the intermediate flow space or cling to the impingement wall region, and e) wherein the deposited particles are discharged from the intermediate flow space.

That filter method has the advantage that the filter element does not have to be exchanged if the through-put volume is reduced by the particles accumulated in the filter element, but in this case, the particles are discharged from the intermediate flow space, and in that way, the original through-put volume can be restored. In that connection, the particles can be discharged continuously or discontinuously.

It is advantageous in particular if the deposited particles are discharged by the influence of the force of gravity. In that case, it is preferred if the intermediate flow spaces extend in a vertical direction, and in that way, permit the deposited particles to be easily discharged.

In addition, the deposited particles can be discharged by means of a mechanical action on the first and/or the second filter wall. That can be effected for example by a manual action on the filter element or by means of a beater mechanism or shaker which is fixed to the filter element.

In particular, the deposited particles can be discharged with a liquid flow. In that case, discharge of the particles by the liquid flow can take place at time intervals, preferably at regular time intervals. For example, it is advantageous if the discharge of the particles is effected in dependence on the amount of the particles collected in the intermediate flow space, so that deposit of the particles always takes place at a given degree of filter contamination.

In particular, discharge of the particles can be effected by passing a liquid flow along the impingement wall region, preferably by cleaning the filter elements with a high-pressure cleaner.

Various production methods for production of a filter element and a gas filter respectively of the above-described kind are set forth hereinafter.

A preferred production method includes the steps of:
providing a first wall plate for a first filter wall,
providing a second wall plate for a second filter wall,
making first openings in the first filter wall,
making second openings in the second filter wall,
connecting the first filter wall to the second filter wall in such a way that the second openings are in a displaced relationship with the first openings in the flow direction, and wherein the first and/or the second wall plate is coated with a water-resistant material, preferably a plastic material.

In that case, it is preferred if the openings are produced prior to connection of the two filter walls, for example by stamping or drilling. The operation of connecting the two filter walls is preferably effected by gluing, welding or by means of mechanical clasping engagement, for example by stamping out a tongue in one connection partner and bending the tongue into a correspondingly shaped opening in the other connection partner. The coating operation can be effected prior to making the openings and connecting the filter walls, for example by using a coated starting material for the first and/or second wall plate. It is however preferred if the coating operation is carried out after the openings are made. That affords complete sealing integrity, even in respect of the cut edges which are possibly produced by the operation of forming the openings, so that it is possible to produce a filter element which is completely water-resistant.

In this respect, the coating operation can preferably be effected by a dip method. That ensures a complete coating effect even of wall regions which involve difficult access from the exterior.

Another preferred production method includes the steps of:
providing a first wall plate for a first filter wall,
providing a second wall plate for a second filter wall,
making first openings in the first filter wall,
making second openings in the second filter wall, and
connecting the first filter wall to the second filter wall, and wherein the first and/or the second filter wall is produced in an extrusion method from a plastic material.

With that production method the first and/or the second wall plate is produced inexpensively and reproducibly from a water-resistant material that ensures water-resistance on the part of the filter element.

In that respect, it is advantageous if a line-shaped fold region is produced in the first and/or the second wall plate, the line-shaped fold region being more deformable than the rest of the wall region. The line-shaped fold region which is produced in that way can advantageously be used for implementing the folding procedure required for producing the filter element. In that respect, it is particularly advantageous if a plurality of such line-shaped fold regions are arranged in a mutually juxtaposed and parallel relationship so as to assume an alternate, zigzag-shaped accordion folding. Deformability can be better both in the elastic region and also in the plastic or in the elastoplastic region, than in the rest of the wall region. For the definition of better deformability, attention is directed to the foregoing description.

In that respect, it is advantageous if a line-shaped material weakening is produced in the first and/or the second wall plate. The folding procedure can be facilitated in that way as, when a folding force is applied to the wall plate, it can preferably be folded along the line-shaped material weakening.

It is further preferred if the improvement in deformability is produced by a reduction in wall thickness, preferably by a non-cutting shaping operation. Thus, for example, a line-shaped stamping operation in which material is displaced out of the line-shaped region towards the sides makes it possible to achieve such a reduction in wall thickness. In addition the desired reduction in wall thickness can be achieved by cutting methods, for example scoring, cutting, scribing, milling, shaving or the like.

In particular, deformability can be improved by the production of a line-shaped perforation. In that way, discontinuous removal of material along the line produces a structural weakening which provides for preferred deformation when force is applied in the region of the line.

In particular, it is preferred if the line-shaped fold region can be produced by means of a tool arranged behind the extrusion tool, for producing the reduction in wall thickness or the perforation respectively. In the case where the line-shaped fold region is to extend in the extrusion direction, the tool arranged in that way, for example in the form of a stamping or embossing tool, which is applied to the wall plate issuing from the extrusion tool, can produce a reduction in wall thickness or a perforation by means of suitable pins, teeth or the like rolling thereagainst. In the case where the line-shaped fold region is to extend transversely to the extrusion direction, the material weakening, in the form of a reduction in wall thickness or perforation, can be produced by a tool which runs transversely with respect to the extrusion direction over the wall plate, preferably a tool which runs diagonally, so as to produce a material weakening which is perpendicular to the extrusion direction, as the extrusion operation progresses.

Thus, the stamping or perforation operation can be effected by a procedure whereby for example a roller which runs transversely to the extrusion direction and on the periphery of which are disposed suitable stamping or perforating devices extending parallel or transversely with respect to the extrusion direction, rolls against the extruded wall plate behind the extrusion tool and in that way produces the desired material weakening.

In particular, it is preferred if the line-shaped fold region extends in the extrusion direction. The direction in which the fold region extends is of a constructional significance as the maximum width of extruded plates, in the thickness required here, is restricted and, at the present time, is between about 1.5 m and 2 m at a maximum. Because the filter elements produced with the subject production method are preferably so that the folds extend in a vertical direction to permit easier discharge of the collected particles from the intermediate flow region, it is necessary for the orientation of the folds relative to the extrusion direction to be adapted to the geometry which is desired for the completed filter element. Thus, for uses in which a filter element is to be disposed on a wall which extends a distance in a horizontal direction, it is advantageous if the folds extend transversely with respect to the extrusion direction as in that case a filter wall of any desired length or a filter element of any desired length can be produced with a limited height (corresponding to the maximum extrusion width). If in contrast it is desired that the filter element to be produced is to extend in subsequent use substantially in a vertical direction and is required to cover only a small width in a horizontal direction, it is advantageous then if the folds extend in the extrusion direction. In that case, it is possible to produce a filter wall of any desired height or a filter element of any desired height, the width of which is limited by the maximum extrusion width. That width is possibly also restricted by the folding of the wall plate, in respect of which the actual width of the filter wall can be reduced, for example a fold angle of 30 degrees can be halved.

In the case where the line-shaped fold region extends in the extrusion direction, it is preferred if the line-shaped fold region is produced by means of an extrusion tool having an opening corresponding to the cross section of the wall plate, with corresponding projections for producing the reduction (s) in wall thickness. In that case, a reduction in material thickness can already be achieved in the extrusion tool.

In addition, it is advantageous in that case if the improvement in plastic deformability is produced by co-extrusion of a material, which is more deformable, in the line-shaped fold region. In that way, a material of reduced modulus of elasticity can be injected in line form into the extruded wall plate and in that way can define the fold region.

With the production method according to the invention, it is particularly preferred if the first and/or second openings is produced by stamping in the first and second filter wall respectively.

It is further preferred if the openings are formed prior to the folding operation.

In the case where the folds are oriented in the extrusion direction, it is particularly preferred if the first filter wall and/or the second filter wall is extruded by means of an extrusion tool of zigzag-shaped cross section in the form of a successively alternately folded wall. In that way, it is possible to make complete use of the maximum extrusion width to produce a filter wall of maximum width. The reduction in the filter wall width which thus occurs upon extrusion of a flat wall plate and subsequent folding can be avoided in that fashion.

In that respect, it is particularly preferred if the first filter wall and the second filter wall are extruded by means of an extrusion tool having two mutually spaced extrusion cross sections which are zigzag-shaped in cross section, in the form of two successively alternately folded walls. In that way, the two filter walls can be extruded in parallel relationship by means of two extrusion tools which are vertically spaced from each other in that way to be able to implement further processing in parallel of the two filter walls after the extrusion operation, in a simple fashion.

In particular, the first filter wall and the second filter wall can be connected together after the extrusion operation, preferably by welding, adhesive or by mechanical clipping. In that respect, attention is directed to the foregoing description.

In particular, it is preferable if the first filter wall and the second filter wall are formed extruded to each other. In that case, the two filter walls are formed in a single extrusion tool having two zigzag-shaped slots which are brought together at the connecting locations in such a way that the connecting regions, in particular connecting limbs or the like, are already formed between the two extruded walls in the extrusion operation, and consequently, it is possible to dispense with a subsequent operation of joining the two filter walls together.

In the situation where the filter walls are extruded in the form of flat surfaces, it is preferable if the filter wall is alternately folded by means of a shaping tool connected downstream of the extrusion tool, preferably by means of hot deformation. That deformation can be effected by conventional rolling, stamping, rolling-stamping or deep-drawing manufacturing methods. In that case, the tools can be heated in order to implement a good plastic deformation condition of the wall plates. Furthermore, the filter walls can be heated by means of separate heating means, prior to the deformation operation.

In that respect, it is particularly preferred if the extruded filter wall is stretched prior to or in the folding operation in a transverse relationship with the extrusion direction. In that way, the problem of the maximum available extrusion width, as a limiting factor for the maximum filter element width which can be produced, can be resolved in constructional respects, insofar as a wall plate of increased wall thickness is extruded and that wall plate is then extended to a greater width by stretching in a transverse relationship with the extrusion direction, for example by a rolling operation.

In this respect, the openings can be produced prior to or after the folding operation and prior to or after the stretching operation. Possibly, in that case, consideration has to be given to subsequent stretching or the orientation of the wall region, in terms of the selection of the tool and the tool dimensions for producing the openings.

It is advantageous in certain cases of use if the line-shaped fold region extends in transverse relationship with the extrusion direction.

The openings can preferably be made by means of a die adapted to the folded filter cross section, after the folding operation.

Finally a further production method for a filter element of the above-indicated kind includes the steps of:
providing a first wall plate for a first filter wall,
providing a second wall plate for a second filter wall,
making first openings in the first filter wall,
making second openings in the second filter wall,
connecting the first filter wall to the second filter wall, and wherein the first and/or the second filter wall is produced in a thermoforming process from a semi-manufactured plastic article.

The thermoforming process on the one hand makes it possible to produce a suitably folded filter wall from a plate-shaped initial semi-manufactured article, in a single working step.

In addition, in the thermoforming process, the openings can be produced in the first and the second wall plates respectively directly, so that it is possible to dispense with subsequent processing for producing those openings.

These and other advantages of the invention will be further understood and appreciated by those skilled in the art by reference to the following written specifications, claims and appended drawings.

BRIEF DESCRIPTION OF THE DRAWINGS

A preferred embodiment of the filter element according to the invention is described with reference to the figures in which:

FIG. 7 shows a perspective view of the connecting profile for connecting two filter elements; and FIG. 8 shows a cross-sectional view of the connecting profile of FIG. 7.

DETAILED DESCRIPTION OF THE PREFERRED EMBODIMENTS

Figure 1:
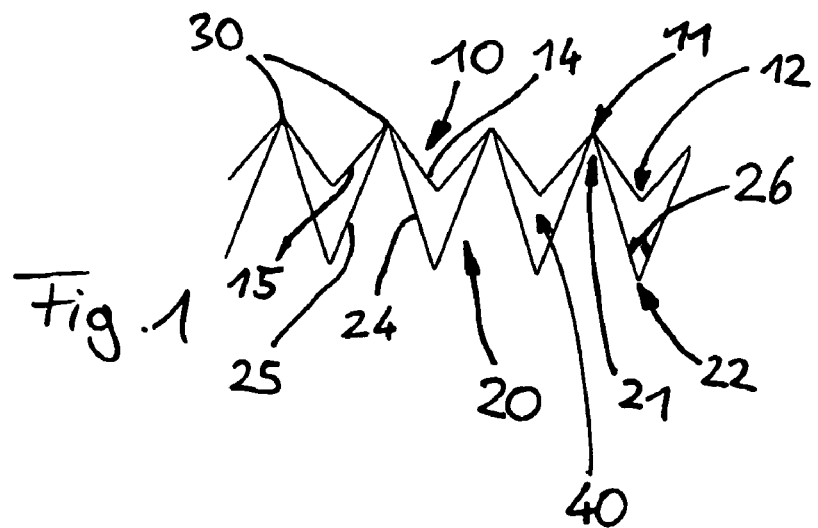
FIG. 1 shows a cross-sectional view of a portion of the filter element according to the invention.
Figure 2:
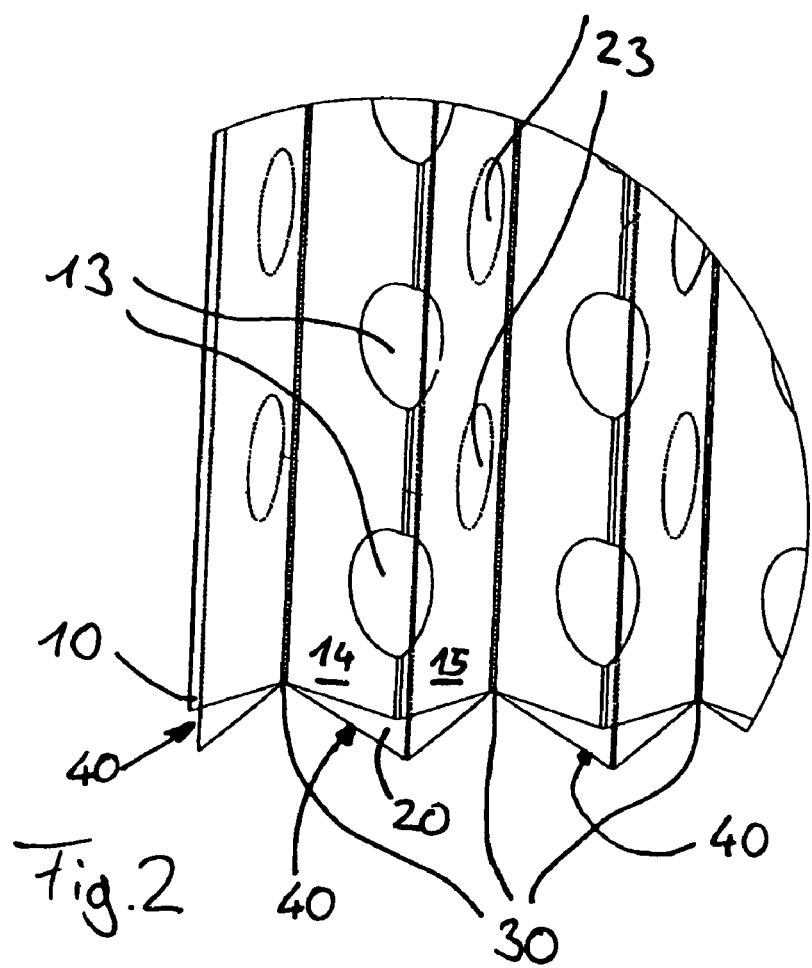
FIG. 2 shows a perspective view of a portion of the filter element according to the invention.

For purposes of description herein, the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
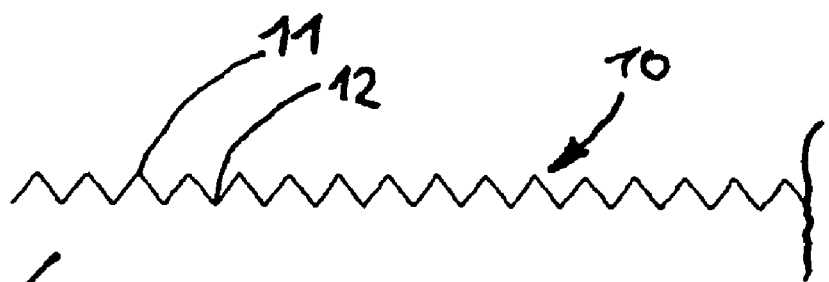
FIG. 4 shows a cross-sectional view of a portion of the first filter wall.
Figure 3:
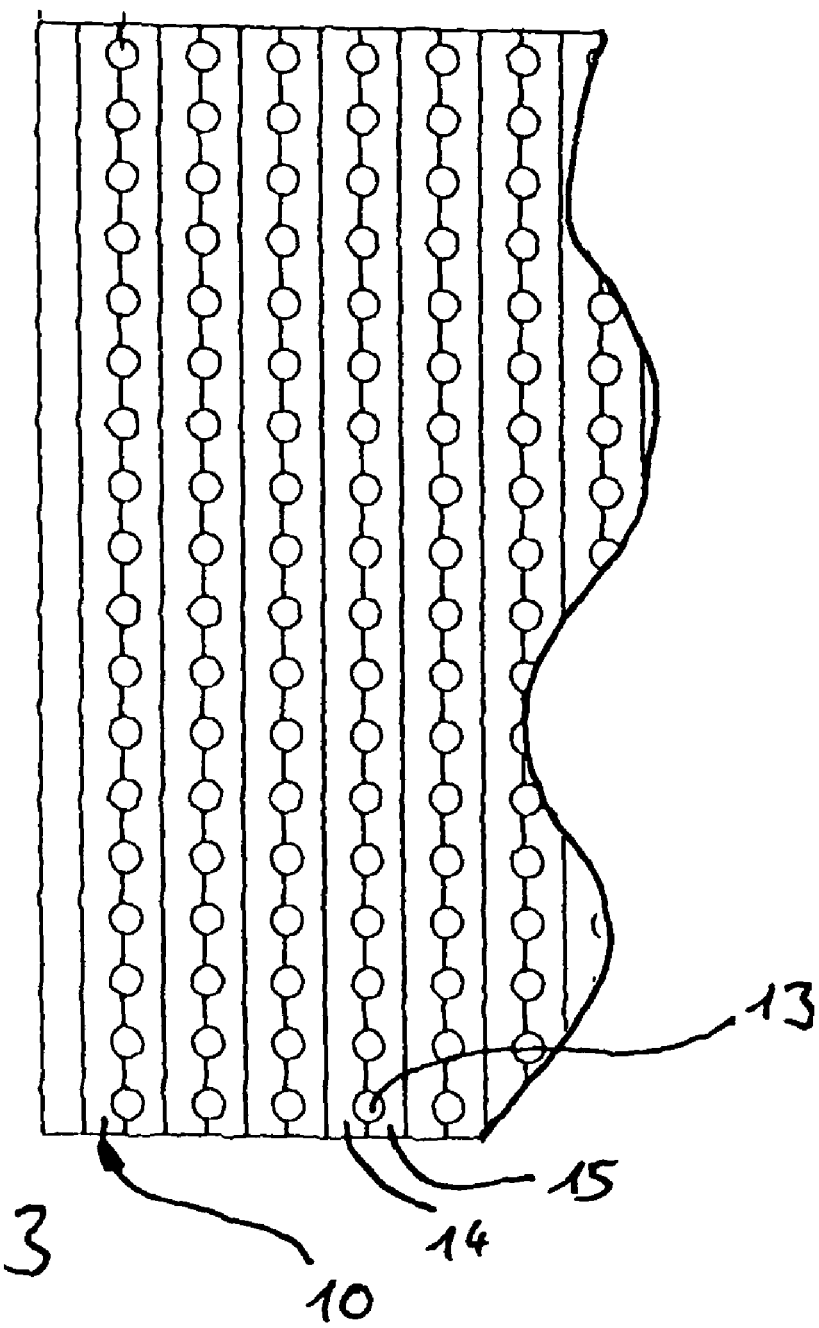
FIG. 3 shows a plan view of a portion of the first filter wall.
Figure 6:
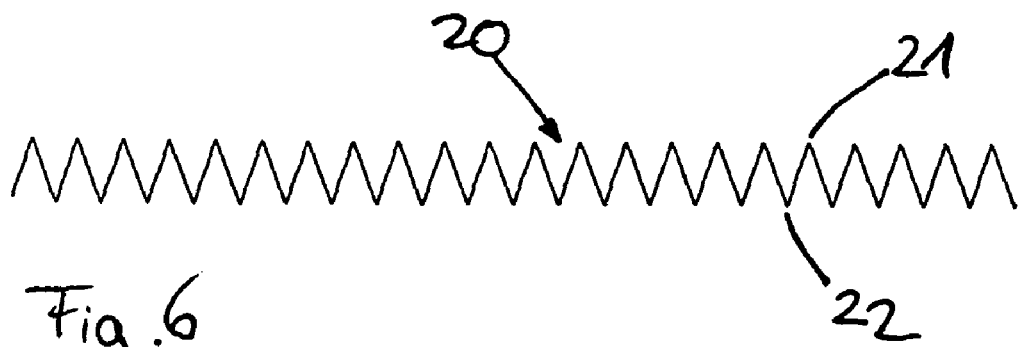
FIG. 6 shows a cross-sectional view of a portion of the second filter wall.
Figure 5:
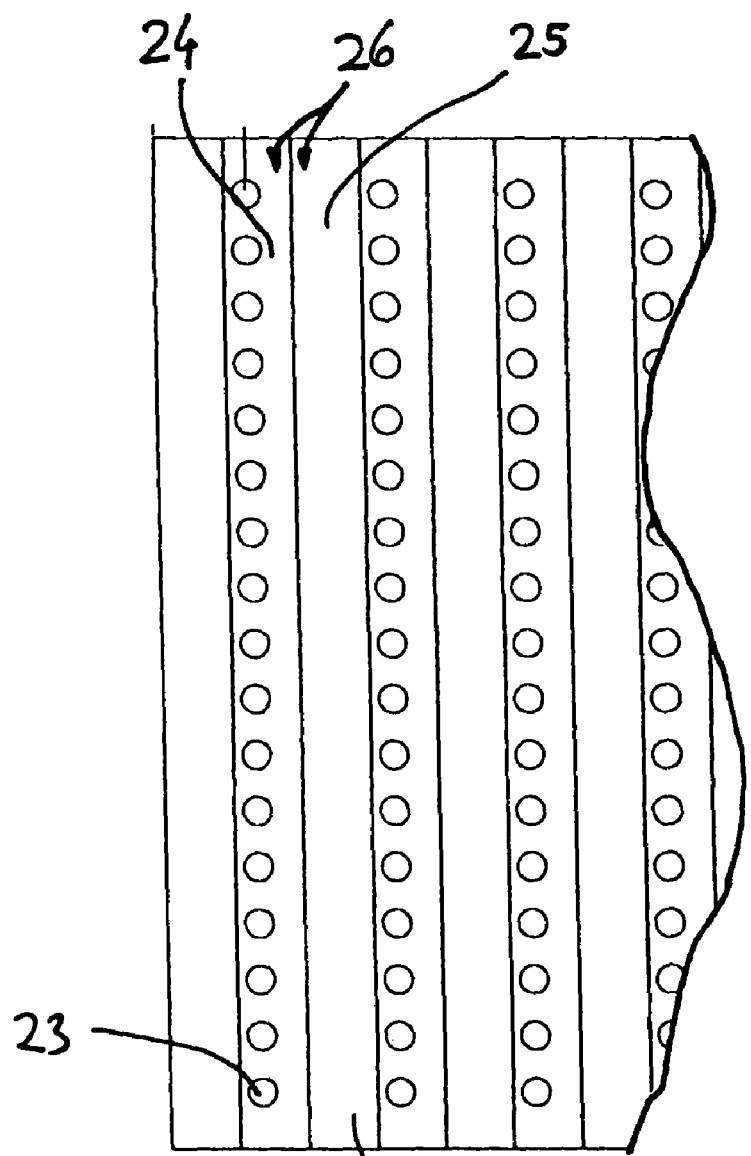
FIG. 5 shows a plan view of the second filter wall.

The filter element shown in FIGS. 1 and 2 includes a first filter wall 10 which is shown in detail in FIGS. 3 and 4, and to which a second filter wall 20, shown in detail in FIGS. 5 and 6, is secured along line-shaped connecting regions 30. FIG. 2 shows a perspective view of the filter element from the discharge flow side; the second filter wall 20 is shown as being transparent for better understanding of the structure of the filter element.

The first filter wall 10 is pleated or folded alternately inward and outward, so as to afford alternately outward fold edges 11 and inward fold edges 12.

Openings 13 are provided in the region of the inward fold edges 12 in the first filter wall at regular spacings along the fold lines 12. The openings 13 embrace the inward fold line 12 and extend into the two wall regions 14, 15, which come together at the fold line 12, of the first filter wall 10. In this arrangement, the openings are not oriented exactly centrally with respect to the fold line, but somewhat eccentrically, so that a larger part of the opening 13 extends into the wall region 14 of the first filter wall, and a smaller part of the opening 13 extends into the adjoining wall region 15 of the first filter wall.

Like the first filter wall, the second filter wall is pleated or folded alternately inward and outward, so as to afford inward fold edges 21 and outward fold edges 22 and wall portions 24 and 25 between the fold edges. The spacing between two inward fold edges 21 of the second filter wall is of the same magnitude as the spacing between two outward fold edges 11 of the first filter wall.

The second filter wall is folded at a more acute angle than the first filter wall. The wall portions between two folds of the second filter wall are longer than those between two folds of the first filter wall.

The first filter wall and the second filter wall are joined together in such a way that the inward fold locations 21 of the second filter wall are in contact with the outward fold locations 11 of the first filter wall. In those regions, the two filter walls are in line contact with each other. The filter walls can be connected together along those two fold locations continuously (for example by adhesive) or discontinuously (for example by spot welding).

The two wall regions which are between an inward fold location of the second filter wall form a triangular cross section. On one side of that triangular wall cross section, openings 23 are formed in the second filter wall at regular spacings along the fold lines between the outward fold 22 and the inward fold 21.

The openings 23 are in displaced relationship with the openings 13 of the first filter wall, in the flow direction. The openings 23 are disposed in that wall region which is remote from the side toward which the opening 13 in the first filter wall extends further, by virtue of its eccentricity.

Provided between the first and the second filter walls is an intermediate flow region 40 which extends in passage form in the direction of the folds and which is subdivided into a plurality of passages extending in parallel relationship, by the connection of the two filter walls in the region of the folds 11, 21.

The unfiltered air which enters through the first openings 13 passes into the intermediate flow region 40 in a direction toward the outward fold location 22 of the second filter wall. The unfiltered gas flow is deflected almost at a right angle in the intermediate flow region in a direction toward the exit openings 23 in the second filter wall. The denser particles in the unfiltered gas flow cannot follow that deflection and impinge against the impingement wall region 26 provided around the outward fold edge 22 of the second filter wall. The particles cling there or are deposited in that region on particles already clinging thereto or, due to the force of gravity, they drop down along the fold line 22 which extends vertically in the illustrated filter element.

Referring to FIGS. 7 and 8, a connecting profile according to the invention includes two U-shaped profiles 50, 60 which are arranged at a spacing from each other and in an opposite relationship with the limbs respectively facing away from each other and extend in mutually parallel relationship. Arranged between the two U-shaped profiles 50, 60 is an intermediate space which is of rectangular cross section and which is delimited by a sidewall extending in the direction in which the U-shaped profiles extend and the base surfaces of the two U-shaped profiles at top and bottom and an opening flap 72. The opening flap 72 is fixed by a plurality of hinges 73 to a limb of the upper U-shaped profile and can be opened by means of a handle 74 to make the intermediate space between the two U-shaped profiles 50, 60 accessible.

The base surface of the upper U-shaped profile 50 has a longitudinally extending opening 51 or a plurality of openings 51 which are spaced from each other in the longitudinal direction and through which the particles which are accumulated in an upper filter element arranged between the two limbs of the upper U-shaped profile can drop into the intermediate space 70. Those particles which drop through impinge against an inclined sliding surface 75, on which they slide in the direction of the opening flap 72.

The base surface of the lower U-shaped profile is closed. The opening 51 is spaced from the limb 52 of the upper U-shaped profile, at the air inlet side, in such a way that the unfiltered gas is prevented from passing through the projecting folds into the intermediate flow region through the wall region 53.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. An agricultural filter element for separating particles from a particle-laden unfiltered gas flow exiting an animal stable or shed, including:
    a first filter wall having a plurality of first through-flow openings for entry of contaminated unfiltered gas;
    a second filter wall disposed downstream of the first filter wall in the flow direction, and having a plurality of second through-flow openings for the exit of clean gas; and wherein one of the first and second filter walls is constructed from an extruded plastic material;
    an intermediate flow space disposed between the first and the second filter walls, wherein the second through-flow openings are arranged in a displaced relationship with the first through-flow openings in the flow direction; the second filter wall has at least one impingement wall region arranged so that particles passing through the first through-flow openings at least partially impinge thereon and are deflected thereby; and at least one of the first and second filter walls has folds which extend alternately inward and outward relative to the intermediate flow space and has increased deformability in relation to the rest of the wall at least portions of the folds having a wall thickness which is reduced relative to the rest of the wall region whereby said filter element can be shifted between a collapsed configuration for storage, transport and disposal, and an expanded configuration for gas flow filtration; and wherein the entire surfaces of the first and second filter walls are liquid-resistant which facilitates removing accumulated particles therefrom for reuse of said filter element, yet permits said filter element to be readily shifted between said collapsed and expanded configurations; and wherein
    the filter element is configured to withstand high pressure cleaning with water in the expanded configuration;
    a plurality of the filter elements arranged in a mutually juxtaposed relationship; wherein
    the filter elements are arranged in a mutually superposed relationship, and are connected together by a connecting profile, including:
    an upper receiving region for receiving an upper one of the filter elements;
    a lower receiving region for receiving a lower one of the filter elements;
    a particle collecting region arranged between the two receiving regions; and
    at least one opening arranged between the upper receiving region and the particle collecting region and through which the particles can drop out of the upper filter element into the particle collecting region.

2. A filter element as set forth in claim 1, wherein:
    the region around the folds of the second filter wall, which fold locations are outward on the filter element, defines the impingement wall region.

3. A filter element as set forth in claim 1, wherein:
    both of the first and second filter walls are folded, with the spacings between outward folds of the first filter wall being equal to the spacings between inward folds of the second filter wall, and wherein the first and second filter walls are arranged relative to each other, so that the folds in the same direction are respectively in a mutually opposite relationship.

4. A filter element as set forth in claim 1, wherein:
    the first through-flow openings are arranged in the region of the inward folds of the first filter wall.

5. A filter element as set forth in claim 1, wherein:
    the first through-flow openings are arranged in the region of the outward folds of the first filter wall.

6. A filter element as set forth in claim 1, wherein:
    the second through-flow openings are arranged in the region of the inward folds of the second filter wall.

7. A filter element as set forth in claim 1, wherein:
    the second through-flow openings are arranged in the wall between the folds of the second filter wall.

8. A filter element as set forth in claim 1, wherein:
    the fold in one of the first and second filter walls is of a strength which is reduced in relation to the rest of the wall.

9. A filter element as set forth in claim 1, wherein:
    the fold in one of the first and second filter walls is of a wall thickness which is reduced at least in portion-wise manner with respect to the rest of the wall.

10. A filter element as set forth in claim 1, wherein:
    the fold in one of the first and second filter walls is of different material properties from the rest of the wall.

11. A filter element as set forth in claim 1, wherein:
    the fold in one of the first and second filter walls has perforations.

12. A filter element as set forth in claim 1, including:
    an opening flap which in the closed condition closes off the particle collecting region from the surroundings and in the open condition permits the removal of the collected particles from the particle collecting region.

13. A filter element as set forth in claim 1, wherein: a horizontal wall portion is disposed between the particle collecting region and one of the upper and lower receiving regions respectively to prevent the entry of unfiltered gas from the particle collecting region of the connecting profile into the intermediate flow region of the filter element.

14. A filter element as set forth in claim 1, wherein: the lowermost filter element is supported by said connecting profile on the ground.

15. A method for making a filter element, comprising the steps of:
    forming a first wall plate for a first filter wall;
    forming a second wall plate for a second filter wall;
    making first openings in the first filter wall;
    making second openings in the second filter wall;
    connecting the first filter wall to the second filter wall in such a way that the second openings are in a displaced relationship with the first openings in the flow direction; and wherein
    one of said first and second wall plate forming steps includes extruding from a plastic material one of the first and second filter walls; and including
    forming a line-shaped fold region in the one of the first and second filter walls, wherein the line-shaped fold region is more deformable than the rest of the wall region;
    reducing the wall thickness of the line-shaped fold region by a non-cutting shaping operation; wherein
    the line-shaped fold region extends in the extrusion direction.

16. A method as set forth in claim 15, wherein:
    the line-shaped fold region is extruded through a tool opening corresponding to the cross section of the wall plate, with corresponding projections for producing the reduction(s) in wall thickness.

17. A method as set forth in claim 15, wherein:
    the improvement in plastic deformability is produced by co-extruding a material in the line-shaped fold region which is more deformable.

18. A method as set forth in claim 15, wherein:
the line-shaped fold region forming step comprises performing the wall thickness reducing step after the extruding step.

19. A method as set forth in claim 15, wherein:
one of the first filter wall and the second filter wall is extruded with a zigzag-shaped cross section in the form of a successively alternately folded wall.

20. A method as set forth in claim 15, wherein:
the first filter wall and the second filter wall are extruded having two mutually spaced extrusion cross sections which are zigzag-shaped in cross section in the form of successively alternately folded walls.

21. A method as set forth in claim 15, wherein:
the first filter wall and the second filter wall are connected together after the extrusion operation, preferably by welding, adhesive or by mechanical clipping.

22. A method as set forth in claim 15, wherein:
the first filter wall and the second filter wall are co-extruded together.

23. A method as set forth in claim 15, wherein:
one of the first and second filter walls is alternately folded downstream of the extrusion tool.

24. A method as set forth in claim 15, wherein:
the extruded one of the first and second filter walls is stretched prior to or in the folding operation in transverse relationship with the extrusion direction.

25. A method as set forth in claim 24, wherein:
the openings are made by means of a die adapted to the folded filter cross section, after the folding operation.

26. A filter element for separating particles from a particle-laden unfiltered gas flow, including:
a first filter wall having a plurality of first through-flow openings for entry of contaminated unfiltered gas;
a second filter wall disposed downstream of the first filter wall in the flow direction, and having a plurality of second through-flow openings for the exit of clean gas; and
an intermediate flow space disposed between the first and the second filter walls, wherein the second through-flow openings are arranged in a displaced relationship with the first through-flow openings in the flow direction; the second filter wall has at least one impingement wall region arranged so that particles passing through the first through-flow openings at least partially impinge thereon and are deflected thereby; and at least one of the first and second filter walls has folds which extend alternately inward and outward relative to the intermediate flow space and has increased deformability in relation to the rest of the wall, whereby the filter element can be shifted between a collapsed configuration for storage, transport and disposal, and an expanded configuration for gas flow filtration; and wherein at least the liquid-resistant impingement wall region is liquid-resistant which facilitates removing accumulated particles therefrom for reuse of the filter element, yet permits the filter element to be readily shifted between the collapsed and expanded configurations; and including
a plurality of filter elements arranged in a mutually juxtaposed relationship, wherein the filter elements are arranged in a mutually superposed relationship, and are connected together by a connecting profile, including:
an upper receiving region for receiving an upper one of the filter elements;
a lower receiving region for receiving a lower one of the filter elements;
a particle collecting region arranged between the two receiving regions; and
at least one opening arranged between the upper receiving region and the particle collecting region and through which the particles can drop out of the upper filter element into the particle collecting region.

27. A filter element as set forth in claim 26, wherein:
the entire surfaces of the first and second filter walls are liquid-resistant;
the liquid-resistant impingement wall region comprises a base material, constructed of a paper based material, and is coated with a liquid-resistant material;
the region around the folds of the second filter wall, which fold locations are outward on the filter element, is the impingement wall region;
both of the first and second filter walls are folded, with the spacings between outward folds of the first filter wall being equal to the spacings between inward folds of the second filter wall, and wherein the first and second filter walls are arranged relative to each other, so that the folds in the same direction are respectively in a mutually opposite relationship;
the first through-flow openings are arranged in the region of the inward folds of the first filter wall;
the second through-flow openings are arranged in the region of the outward folds of the second filter wall;
the second through-flow openings are arranged in the wall between the folds of the second filter wall;
the fold in the one of the first and second filter walls is of a strength which is reduced in relation to the rest of the wall;
the fold in one of the first and second filter walls is of a wall thickness which is reduced at least in portion-wise manner with respect to the rest of the wall; and
the fold in one of the first and second filter walls has perforations.

28. A method for making a filter element, comprising the steps of:
forming a first wall plate for a first filter wall;
forming a second wall plate for a second filter wall;
making first openings in the first filter wall;
making second openings in the second filter wall;
connecting the first filter wall to the second filter wall in such a way that the second openings are in a displaced relationship with the first openings in the flow direction; and wherein
one of said first and second wall plate forming steps includes extruding from a plastic material one of the first and second filter walls; and including
forming a line-shaped fold region in the one of the first and second filter walls, wherein the line-shaped fold region is more deformable than the rest of the wall region;
reducing the wall thickness of the line-shaped fold region by a non-cutting shaping operation; and
wherein the line-shaped fold region extends transversely to the extrusion direction.

29. A method for making a filter element, comprising the steps of:
forming a first wall plate for a first filter wall;
forming a second wall plate for a second filter wall;
making first openings in the first filter wall;
making second openings in the second filter wall;
connecting the first filter wall to the second filter wall in such a way that the second openings are in a displaced relationship with the first openings in the flow direction; and wherein one of said first and second wall plate forming steps includes extruding from a plastic material one of the first and second filter walls; and including forming a line-shaped fold region in the one of the first and second filter walls, wherein the line-shaped fold region is more deformable than the rest of the wall region;

reducing the wall thickness of the line-shaped fold region by a non-cutting shaping operation; and wherein the line-shaped fold region extends transversely to the extrusion direction.

* * * * *